United States Patent [19]

O'Meara

[11] 4,189,773

[45] Feb. 19, 1980

[54] ON-LINE MEMORY SPACE ALLOCATION

[75] Inventor: Michael F. O'Meara, Fos-sur-Mer, France

[73] Assignee: General Electric Company, Salem, Va.

[21] Appl. No.: 485,572

[22] Filed: Jul. 3, 1974

[51] Int. Cl.² .............................................. G06F 9/19
[52] U.S. Cl. ..................................... 364/300; 364/200
[58] Field of Search ................ 340/172.5; 444/1, 435, 444/436; 364/200 MS File, 900 MS File, 700, 300, 715, 716

[56] References Cited

U.S. PATENT DOCUMENTS

| | | | |
|---|---|---|---|
| 3,969,722 | 7/1976 | Danco et al. | 364/200 |
| 3,969,723 | 7/1976 | Kennicot | 364/200 |
| 4,079,447 | 3/1978 | Garziera | 364/200 |

OTHER PUBLICATIONS

Holloman; D. R., *Forward and Backward Chaining of Data Areas*, IBM Technical Disclosure, vol. 13, No. 7, Dec. 1970, pp. 1956–1960.
Baugh; C. R., *Storage Allocation and Relocation*, Proceedings of 20th Nat'l Conference Computing Machinery, 1965, pp. 315–324.
Haddon et al., *A Compaction Procedure for Variable Length Storage Elements*, The Computer Journal, vol. 10, No. 2, 1965, pp. 162–166.

*Primary Examiner*—Harvey E. Springborn
*Attorney, Agent, or Firm*—Arnold E. Renner

[57] ABSTRACT

A programmable data processor or controller serving as the main control in a control system contains an executive program for controlling the transfer of information between the processor and system equipment, updating that information during on-line control of the equipment and modifying the executive program to change operating parameters of the system while the data processor is controlling the system equipment. Modification of the executive program and displaying of system parameters relative to the executive program and the system equipment is accomplished through the use of an operator's console which communicates with the data processor and system equipment as a result of operator intervention.

11 Claims, 74 Drawing Figures

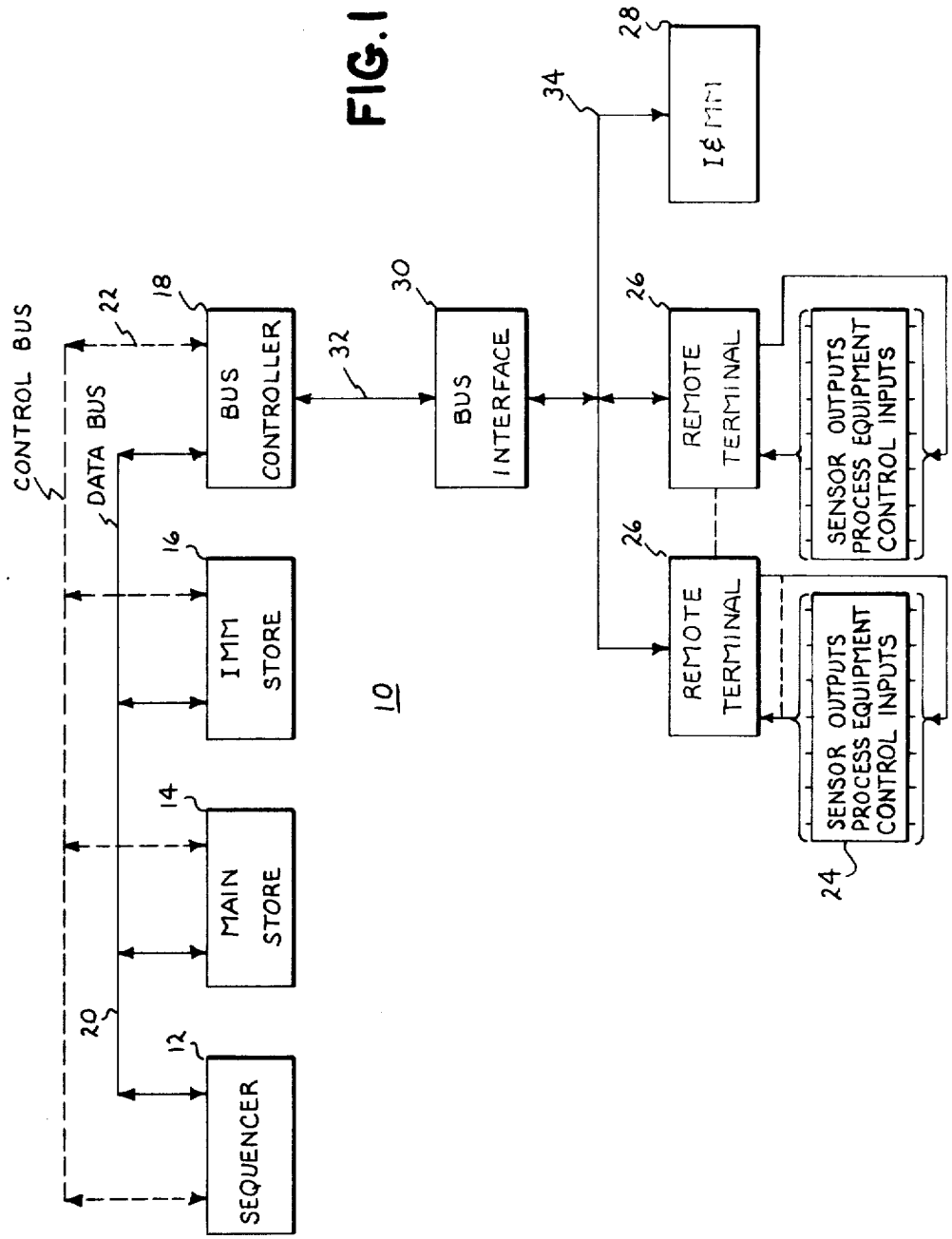

ON-LINE MEMORY SPACE ALLOCATION

BACKGROUND OF THE INVENTION

1. Field of the Invention

This invention relates generally to a method and means for compacting and expanding stored information, sometimes referred to as memory space allocation, in a computer memory, and more particularly to a method of optimizing memory space in a control program which is changed while the control program is running to control a process uninterrupted.

2. Description of the Prior Art

Data processors or programmable controllers are known which store control programs for controlling equipments in various types of processes. For various reasons it is frequently desirable or necessary to modify these programs in order to implement changes to alter the manner in which a process is controlled.

To the best of the inventor's knowledge, there is no known method for modifying a control program in an on-line computer system while still running the control program such that the process is controlled uninterrupted and at the same time optimize the memory space of the modified control program. A need exists to be able to perform this type of program modification in that it is extremely costly to shut down a completely automated process control system to make program changes. Additionally, when memory space is not optimized, a great deal of memory space is wasted which could be made available for the retention of other programs or for storing data. Costs occur because of the stoppage in production and the possibility of having to pay idle workers while the program changes are being made. In view of these adversaties, it is highly desirable that a means and method be provided to prevent production stoppages while changing a control program whereby memory space is optimized concurrently with the changes.

SUMMARY OF THE INVENTION

Accordingly it is a primary object of the invention to provide a method in an on-line data processing system for optimizing memory space for a program to be modified while the system is in operation.

It is another object to provide a method of transferring a modified segment of a control program from one portion of a data processing system memory to a control program in another portion of the memory while running the control program essentially uninterrupted.

Still another object is to optimize memory space in a portion of a computer memory containing a control program while that program is modified by the insertion of segments of data therein.

A still further object is to allocate the exact amount of space required in a computer memory for receiving data segments of variable size to modify a control program in the memory while running the control program and controlling a process uninterrupted.

In accordance with the present invention, a programmable data processing system is provided for controlling equipments such as those used in an industrial process. The memory contains an executive program for governing the operation of the data processing system. Further, one portion of memory contains a repetitively executable application or control program. The application program is comprised of identifiable segments of words which are located in contiguous memory locations.

A second portion of memory provides a temporary storage region for storing replacement segments which are to replace corresponding segments in the application program.

A first branch instruction is placed in the first memory location of each application program segment to be replaced or modified and a second branch instruction is placed after the last instruction of each replacement segment. The first branch instruction effects a branch to a corresponding replacement segment whereby that segment runs as part of the application program in place of its corresponding segment in the application program. The second branch instruction effects a branch back to the application program to the proper segment for continued execution of the application program.

During the running of the application program, the instructions of each replacement segment are moved from the second portion of memory into corresponding segments in the application program to then become a permanent part thereof. This moving is accomplished by determining the amount of space required in the application program by each replacement segment and then shifting a maximun number of instructions in the application program segment corresponding to the replacement segment for each repetitive execution of the application program until the determined number of instructions has been shifted. The replacement segment is then moved from the second portion of memory into its corresponding segment of the application program.

The application program and the replacement segments in the second portion of memory run to control the process equipment essentially uninterrupted because the maximum number of instructions shifted and the number of instructions moved for any given entry into the application program requires so little time that the process equipment is unaware that the steps of memory space allocation and segmentation movement are taking place.

BRIEF DESCRIPTION OF THE DRAWINGS

While the novel features of this invention are set forth with particularity in the appended claims the invention both as to organization and content will be better understood and appreciated along with other objects and features thereof from the following detailed description taken in conjunction with the drawings in which:

FIG. 1 is a major block diagram of a programmable data processor control system of the type disclosed herein.

For a complete description of the system of FIG. 1 and of my invention, reference is made to U.S. Pat. No. 3,969,722, "Method And Apparatus For Operator Interrogation Of Simulated Control Circuits" by William J. Danco and Arthur P. Given, issued July 13, 1976 and assigned to the assignee of the present invention. More particularly, attention is directed to FIGS. 2 through 29 and 31 through 67 of the drawing and to that part of the descriptive portion of the specification starting at Column 2, line 58 and continuing through the end of Column 150 (including the incorporated U.S. Pat. Nos. 3,921,146 and 3,924,240) and further including Appendix A (beginning at the bottom of Column 150 and continuing into Column 170 and Appendix B (beginning in Column 170 and continuing to the Claims in Columns 223 and 224) all of which are incorporated hereinto by reference and made a part hereof as if fully set forth herein.

I claim:

1. In an on-line data processing system for controlling equipment, a method, by means of an improved executive program, of changing at least a segment of an on-line application program and of optimizing memory space utilization by assuring contiguous positions of identifiable program segments comprised of instructions located in the memory after modification of a segment size while without interruption continuing the control of the equipment in accordance with the instructions in the modified segment comprising the steps:
   (A) providing in the memory at least first, second and third portions,
      (1) said first portion retaining said improved executive program governing the operation of the data processing system,
      (2) said second portion having located therein a repetitively executable application program comprised of a plurality of individually identifiable segments disposed contiguously to one another, the instructions thereof being representative of logical states for controlling the equipment, and
      (3) said third portion serving as a temporary store for a desired replacement segment which is to replace a segment in said second portion;
   (B) inserting, under control of the executive program, a first branch instruction in the first memory instruction location of the segment to be replaced and a second branch instruction after the last instruction location of the replacement segment so that the application program is still repetitively executable by using the replacement segment while that segment is still in the third portion;
   (C) determining, under control of the executive program, the amount of memory space that the replacement segment will occupy in the second portion;
   (D) moving, under control of the executive program, all the application program segments in the memory following the segment to be replaced in said second portion in dependence upon the space requirements determined for said replacement segment; and
   (E) writing, under control of the executive program, said replacement segment into the second portion of the memory in the space created by the moving of all the segments.

2. The invention in accordance with claim 1 wherein, when said replacement segment is larger than the segment to be replaced, all the application program segments following the segment to be replaced are moved prior to the writing of the replacement segment into the second portion of memory.

3. The invention in accordance with claim 2 including the steps of writing instruction words indicating no operation into instruction location vacated by the moving of the following segments.

4. The invention in accordance with claim 1 wherein, when said replacement segment is smaller than the segment to be replaced, the step of writing the replacement segment from the third to the second memory portion is performed prior to the step of moving of all the segments.

5. The invention in accordance with claim 1 wherein a specified maximum number of instructions are moved for each execution of the application program in adjusting the segments in the second portion until the determined space has been provided for the replacement segment.

6. The invention in accordance with claim 1 including the step of adjusting the end point of the application program while establishing a parameter defining an expansion area for the application program in said second portion.

7. The invention in accordance with claim 1 wherein a plurality of replacement segments in said third portion replace a corresponding plurality of segments in said second portion and wherein the writing of a first segment and the step of adjusting are completed prior to the writing of a second segment.

8. In an on-line data processing system for controlling equipment, a method, by means of an improved executive program, of changing at least a segment of an on-line application program and of optimizing memory space utilization by assuring contiguous positions of identifiable program segments comprised of instructions located in the memory after modification of a segment size while without interruption continuing the control of the equipment in accordance with the instructions in the modified segment comprising the steps:
   (A) providing in the memory at least first, second and third portions,
      (1) said first portion retaining said improved executive program governing the operation of the data processing system,
      (2) said second portion having located therein a repetitively executable application program comprised of a plurality of individually identifiable segments disposed contiguously to one another, the instructions thereof being representative of logical states for controlling the equipment, and
      (3) said third portion serving as a temporary store for a desired replacement segment which is to replace a segment in said second portion;
   (B) writing, under control of the executive program, a segment to be modified from said second memory portion to said third memory portion;
   (C) inserting, under control of the executive program, a first branch instruction in the first memory location of the segment to be replaced and a second branch instruction after the last word of the replacement segment so that the application program may still be run using the replacement segment while that segment is in the third portion;
   (D) modifying, under control of the executive program, the copied segment located in said third memory portion;
   (E) determining, under control of the executive program, the amount of space that the replacement segment will occupy in the second portion;
   (F) adjusting, under control of the executive program, the application program segments in the memory immediately adjacent the segment to be replaced to provide adequate space in said second portion required by said replacement segment; and
   (G) writing, under control of the executive program, said replacement segment into the provided space while removing the branch instruction from the first memory location of the segment to be replaced.

9. The invention in accordance with claim 8 wherein, when said replacement segment is larger than the segment to be replaced, all the application program segments following the segment to be replaced are moved prior to the writing of the replacement segment into the second portion of memory.

10. The invention in accordance with claim 9 wherein, under control of the executive program, instruction words indicating no operation are placed into spaces vacated by the adjustment of the following segment.

11. The invention in accordance with claim 8 wherein, when said replacement segment is smaller than the segment to be replaced, the replacement segment is copied from the third to the second memory portion prior to adjustment of an immediately adjacent segment.

* * * * *